(12) United States Patent
Feinauer et al.

(10) Patent No.: US 10,266,165 B2
(45) Date of Patent: Apr. 23, 2019

(54) BRAKING SYSTEM FOR A VEHICLE, METHOD FOR OPERATING A BRAKING SYSTEM OF A VEHICLE, AND MANUFACTURING METHOD FOR A BRAKING SYSTEM FOR A VEHICLE

(71) Applicant: Robert Bosch GmbH, Stuttgart (DE)

(72) Inventors: Jochen Feinauer, Neuenstein (DE); Stefan Strengert, Stuttgart (DE); Karl-Heinz Willmann, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 10 days.

(21) Appl. No.: 14/932,692

(22) Filed: Nov. 4, 2015

(65) Prior Publication Data
US 2016/0129897 A1 May 12, 2016

(30) Foreign Application Priority Data

Nov. 7, 2014 (DE) .................. 10 2014 222 753

(51) Int. Cl.
| | |
|---|---|
| *B60T 8/26* | (2006.01) |
| *B60T 13/68* | (2006.01) |
| *B60T 7/04* | (2006.01) |
| *B60T 13/66* | (2006.01) |
| *B60T 13/74* | (2006.01) |
| *B60T 8/1766* | (2006.01) |
| *B60T 8/40* | (2006.01) |

(52) U.S. Cl.
CPC ............ *B60T 13/686* (2013.01); *B60T 7/042* (2013.01); *B60T 8/1766* (2013.01); *B60T 8/268* (2013.01); *B60T 13/662* (2013.01); *B60T 13/745* (2013.01); *B60T 8/4072* (2013.01); *B60T 2270/402* (2013.01)

(58) Field of Classification Search
CPC ...... B60T 13/686; B60T 7/042; B60T 13/662; B60T 13/745; B60T 8/1766; B60T 8/268; B60T 2270/402; B60T 8/4072
USPC ........................................................ 701/70
See application file for complete search history.

(56) References Cited

U.S. PATENT DOCUMENTS

| | | | | |
|---|---|---|---|---|
| 4,850,650 | A | * 7/1989 | Eckert | ................... B60T 8/1766 303/155 |
| 2003/0066720 | A1 | * 4/2003 | Sakamoto | ............. B60T 8/1706 188/177 |

(Continued)

FOREIGN PATENT DOCUMENTS

DE    10 2011 075 968    11/2012

*Primary Examiner* — Redhwan K Mawari
*Assistant Examiner* — Rodney P King
(74) *Attorney, Agent, or Firm* — Norton Rose Fulbright US LLP; Gerard Messina

(57) ABSTRACT

A braking system for a vehicle includes: a front axle wheel brake cylinder; a rear axle wheel brake cylinder; and a control electronics system for controlling a first brake pressure in the front axle wheel brake cylinder and/or a second brake pressure in the rear axle wheel brake cylinder. A limiting value z-critical is defined for the braking system, which specifies a maximum braking action, at which a traction stress on the front axle of the vehicle and a traction stress on the rear axle of the vehicle are equal. The braking system is mechanically configured for a z-critical of at least 0.7 g, and the braking system is controlled by the control electronics system during operation using a z-critical value of at most 0.7 g.

14 Claims, 2 Drawing Sheets

(56) References Cited

U.S. PATENT DOCUMENTS

| | | | | |
|---|---|---|---|---|
| 2004/0238244 | A1* | 12/2004 | Amanuma | B60K 6/52 180/65.225 |
| 2009/0326766 | A1* | 12/2009 | Wang | B60R 21/0134 701/46 |
| 2012/0123646 | A1* | 5/2012 | Mantini | B60G 17/019 701/48 |
| 2013/0062931 | A1* | 3/2013 | Kunz | B60T 8/348 303/3 |

* cited by examiner

BRAKING SYSTEM FOR A VEHICLE, METHOD FOR OPERATING A BRAKING SYSTEM OF A VEHICLE, AND MANUFACTURING METHOD FOR A BRAKING SYSTEM FOR A VEHICLE

BACKGROUND OF THE INVENTION

1. Field of the Invention

The present invention relates to a braking system for a vehicle and a vehicle. The present invention also relates to a method for operating a braking system of a vehicle.

Furthermore, the present invention relates to a manufacturing method for a braking system for a vehicle.

2. Description of the Related Art

A control device for a braking system of a vehicle and a method for operating a braking system of a vehicle are described in published German patent application document DE 10 2011 075 968 A1. The particular braking system includes two brake circuits, each having two wheel brake cylinders. The wheels on the front axle are assigned to the two wheel brake cylinders of the first brake circuit, while the wheels on the rear axle are assigned to the two wheel brake cylinders of the second brake circuit. The second brake circuit should be disconnectable from a master brake cylinder of the braking system by closing a separating valve in such a way that a brake fluid displacement from the master brake cylinder into the wheel brake cylinders of the second brake circuit is suppressible. Furthermore, brake fluid should be pumpable with the aid of a pump of the second brake circuit from a brake fluid reservoir of the braking system into the wheel brake cylinders (which are disconnected from the master brake cylinder) of the second brake circuit.

BRIEF SUMMARY OF THE INVENTION

The present invention provides possibilities for ensuring an ideal brake force distribution at least during operation (normal operation) of the particular braking system. At the same time, a vehicle equipped with the particular braking system may be decelerated rapidly and reliably in the case of a fault/in the fallback level. The present invention therefore combines a pleasant braking comfort of the vehicle equipped with the particular braking system with a high safety standard thereof.

Since a maximum achievable deceleration is a function of a brake force distribution, which is installed with the aid of limiting value z-critical, the braking system according to the present invention enables, due to its mechanical design for a z-critical of at least 0.7 g, a high level of deceleration for braking the vehicle without locking of a vehicle axle, especially without locking of the rear axle of the vehicle. At the same time, the desired ideal brake force distribution may be reliably maintained during operation (normal operation) of the braking system. A high level of deceleration and lateral stability are even implemented in the fallback level in the braking system according to the present invention.

Limiting value z-critical is understood as a limiting value which is relevant for a stability of the particular vehicle, which is achieved in particular when the traction stress on the front axle of the vehicle and the traction stress on the rear axle of the vehicle are equal. (When this condition is met for all braking actions, this is referred to as ideal brake force distribution.). The maximum braking action using the installed brake force distribution, which just ensures the stability, is referred to as limiting value z-critical (sometimes also referred to as z-crit).

In one advantageous specific embodiment of the braking system, the at least one front axle wheel brake cylinder is situated in a front axle brake circuit, which is connected to a master brake cylinder of the braking system, and the at least one rear axle wheel brake cylinder is situated in a rear axle brake circuit, the rear axle brake circuit being disconnectable from the master brake cylinder via closing of a separating valve. With the aid of closing of the separating valve, a brake application by a driver, who actuates a brake actuating element (brake pedal) connected to the master brake cylinder, via the master brake cylinder into the at least one rear axle wheel brake cylinder of the rear axle brake circuit is therefore suppressible. As described in greater detail hereafter, this procedure may be used for setting a desired (ideal) brake force distribution between the front axle and the rear axle.

In addition, the rear axle brake circuit may be connected via a suction line to a brake fluid reservoir of the braking system, at least one pump of the rear axle brake circuit being activatable with the aid of the control electronics system in such a way that brake fluid is pumpable with the aid of the at least one pump of the rear axle brake circuit from the brake fluid reservoir into the at least one rear axle wheel brake cylinder of the rear axle brake circuit. If desired, the at least one second brake pressure in the at least one rear axle wheel brake cylinder of the rear axle brake circuit may therefore be increased (in relation to the actuation of the brake actuating element by the driver). This procedure may also be used for implementing the desired (ideal) brake force distribution between the front axle and the rear axle.

The braking system preferably includes a brake booster, the brake booster being activatable in the event of a functional impairment and/or a functional failure of the at least one hydraulic component of the braking system and/or the control electronics system in such a way that the at least one first brake pressure in the at least one front axle wheel brake cylinder and/or the at least one second brake pressure in the at least one rear axle wheel brake cylinder may be increased. Therefore, even in the event of a functional impairment or a failure of an ESP system of the braking system, the driver may still be significantly assisted during the braking of his vehicle with the aid of the (for example, electromechanical) brake booster. Therefore, the driver still has the possibility, even in the case of such a fault, of bringing his vehicle rapidly to a standstill with relatively little effort. The embodiment described here of the braking system therefore provides a high safety standard for it.

The braking system is preferably mechanically designed for a z-critical of at least 0.8 g. In particular, the braking system may be mechanically designed for a z-critical of at least 0.9 g. It is furthermore possible that the braking system is mechanically designed for a z-critical of at least 1 g. Therefore, in the case of a fault/in the fallback level, a comparatively strong brake pressure buildup is still possible in the at least one front axle wheel brake cylinder and in the at least one rear axle wheel brake cylinder. The vehicle equipped with the braking system may therefore be stopped rapidly and reliably.

Alternatively or additionally to the above-described specific embodiments, the braking system may be operable due to the control electronics system during operation using a z-critical of at most 0.6 g. If desired, the braking system may be operable due to the control electronics system during operation using a z-critical of at most 0.5 g. In particular, the braking system may be operable due to the control electronics system during operation using a z-critical of at most 0.4 g. An ideal brake force distribution may therefore be reliably ensured at least for the operation (normal operation) of the braking system, which is activated with the aid of the control electronics system.

The above-described advantages are also implemented in a vehicle having such a braking system.

In addition, the above-described advantages are ensured when carrying out a corresponding method for operating a braking system of a vehicle. The method for operating a braking system of a vehicle is refinable according to the above-explained specific embodiments of the braking system.

Furthermore, carrying out a corresponding manufacturing method for a braking system for a vehicle also provides the above-described advantages. The manufacturing method for a braking system for a vehicle is also refinable according to the above-described specific embodiments of the braking system.

DETAILED DESCRIPTION OF THE INVENTION

Figure 1A:
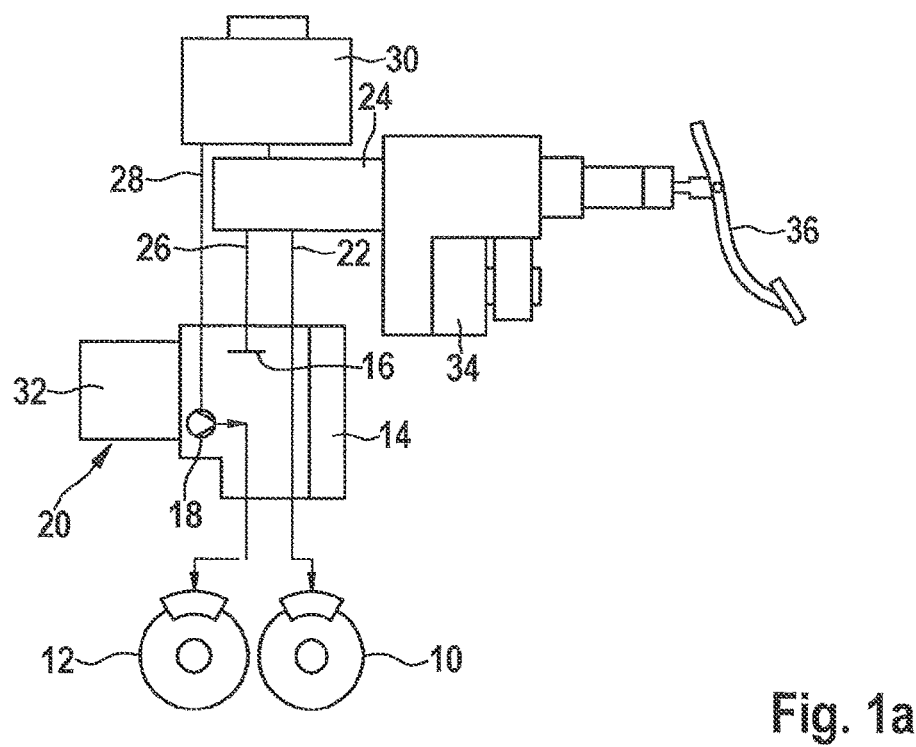
FIGS. 1a and 1b show a schematic representation of one specific embodiment of the braking system and a coordinate system to explain its vehicle axle brake force distribution.
Figure 1B:
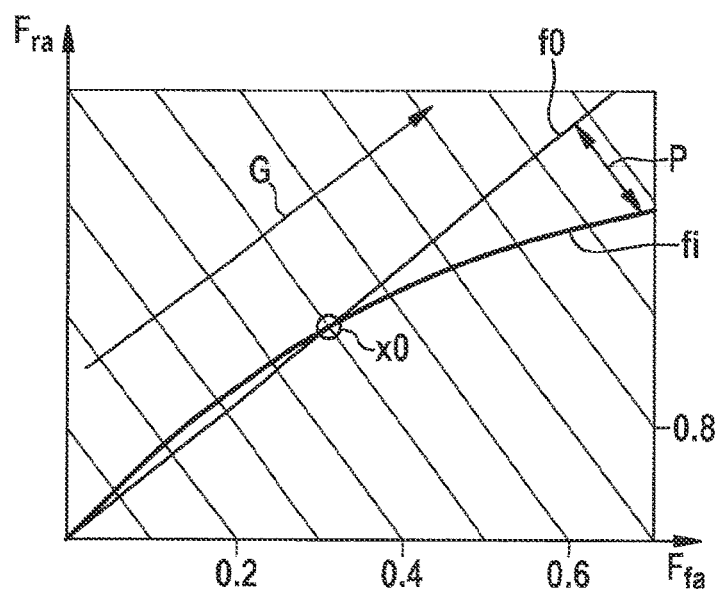

FIGS. 1a and 1b show a schematic representation of one specific embodiment of the braking system and a coordinate system to explain its vehicle axle brake force distribution.

The braking system which is schematically shown in FIG. 1a is usable in a vehicle/motor vehicle (not shown) having at least one front axle and one rear axle. The usability of the braking system is not limited to a specific vehicle type/motor vehicle type, however. For example, the vehicle/motor vehicle may also have at least one further vehicle axle in addition to the front axle and the rear axle.

The braking system includes at least one front axle wheel brake cylinder 10, in which at least one first brake pressure may be built up in such a way that, with the aid of the at least one front axle wheel brake cylinder 10, in each case a front axle braking torque is exertable on the front axle of the vehicle equipped with the braking system and/or on at least one wheel of the front axle. With the aid of the at least one front axle wheel brake cylinder 10 (overall), a front axle brake force Ffa (brake force front axle) is exertable on the front axle and/or on the at least one wheel of the front axle. The braking system also includes at least one rear axle wheel brake cylinder 12, in which at least one second brake pressure may be built up in such a way that, with the aid of the at least one rear axle wheel brake cylinder 12, in each case a rear axle braking torque is exertable on the rear axle of the vehicle and/or on at least one wheel of the rear axle. Independently of the number of rear axle wheel brake cylinders 12, a rear axle brake force Fra (brake force rear axle) is effectuatable on the rear axle and/or the at least one wheel of the rear axle using the at least one rear axle wheel brake cylinder 12.

The implementability of the vehicle which may be equipped with the braking system is not restricted to a specific number of the wheels attached to the front axle and the rear axle. Solely as an example, it is presumed hereafter that the vehicle equipped with the braking system includes two wheels in each case both on the front axle and also on the rear axle. Preferably, in this case the braking system is equipped with two front axle wheel brake cylinders 10 (which together effectuated front axle brake force Ffa), which are assigned to the front axle, and two rear axle wheel brake cylinders 12 (to jointly effectuate rear axle braking force Fra), which are assigned to the rear axle.

Furthermore, the braking system also includes a control electronics system 14, with the aid of which at least one hydraulic component 16 and 18 of the braking system is activatable in such a way that the at least one first brake pressure in the at least one front axle wheel brake cylinder 10 and/or the at least one second brake pressure in the at least one rear axle wheel brake cylinder 12 are variable. The at least one hydraulic component 16 and 18 which is activatable in this way with the aid of control electronics system 14 may also be understood as the at least one hydraulic component 16 and 18 integrated into an ESP system 20 of the braking system. Control electronics system 14 may be designed in particular for controlling ESP system 20 (for example, an ESP hev II). In addition, control electronics system 14 may be installed on ESP system 20. However, it is to be noted that also at least one hydraulic component of the braking system situated outside ESP system 20 or at least one hydraulic component of a braking system without an ESP system is activatable with the aid of control electronics system 14. Examples of the at least one hydraulic component 16 and 18 activatable with the aid of control electronics system 14 are described hereafter.

In general, it is preferable that during braking of a vehicle, a force stress on the front axle of the vehicle and a force stress on the rear axle of the vehicle are equal. If this condition is met for braking actions, this is referred to as an ideal brake force distribution. The shortest braking distance is achieved using this, if the highest traction stress (as coefficient of traction $\mu$ traction) prevails on all wheels.

For the braking system of FIG. 1a, a limiting value z-critical (also z-crit) is definable, which specifies the maximum braking action at which a force stress on the front axle of the vehicle and a force stress on the rear axle of the vehicle are (still) equal. One may also paraphrase it in that limiting value z-critical for the stability is just reached when the force stress on the front axle and on the rear axle are (still) equal. The maximum braking action using the installed brake force distribution, which still ensures the stability according to the above condition, may also be referred to as limiting value z-critical (also z-crit).

The installed brake force distribution of a conventional braking system frequently deviates from the ideal brake force distribution due to structural boundary conditions, so that the traction stress is not always equal between the front axle and the rear axle and is not optimized for all braking actions in the sense of stability. This disadvantage may be bypassed with the aid of the braking system of FIG. 1a, however.

The braking system of FIG. 1a is mechanically designed for a z-critical (z-crit) of at least 0.7 g. This may also be paraphrased in that the braking system is designed due to a structural design/formation of its mechanical components for a z-critical (z-crit) of at least 0.7 g. This may also be referred to as a design of the basic brake for a z-critical of at least 0.7 g. At the same time, the braking system is controllable due to control electronics 14 during an operation (normal operation) using a z-critical (z-crit) of at most 0.7 g. This may also be paraphrased in that due to the design/programming of control electronics 14, it activates the braking system at least during operation (normal operation) in such a way that during operation (normal operation), z-critical (z-crit) is at most at 0.7 g.

The advantages of the design of the braking system described in the preceding paragraph will be explained hereafter on the basis of FIG. 1*b*:

FIG. 1*b* shows a coordinate system, the abscissa of which depicts front axle brake force Ffa (brake force front axle) and the ordinate of which depicts rear axle brake force Fra (brake force rear axle). The achievable decelerations (in m/s$^2$) are specified with the aid of axis G plotted in the coordinate system.

During operation (normal operation), the at least one hydraulic component 16 and 18, or ESP system 20 of the braking system, is activated in such a way that a z-critical (z-crit) of at most 0.7 g is presumed. A curve fi plotted in the coordinate system depicts the vehicle axle brake force distribution effectuated/implemented during operation (normal operation) with the aid of control electronics system 14. Curve fi (during operation/normal operation using z-critical of at most 0.7 g) corresponds to the ideal brake force distribution/ideal vehicle axle brake force distribution (ideal brake force distribution). (For the ideal brake force distribution, the rear axle is braked less strongly than the front axle here, whereby improved stability of the decelerated vehicle is achieved).

However, if a functional impairment or a functional failure occurs on at least one component of the braking system, for example, on the at least one hydraulic component 16 and 18 and/or on control electronics system 14, a z-critical of at least 0.7 g may be used in the fallback level (fail operational level). The vehicle axle brake force distribution occurring in the fallback level, which is shown in FIG. 1*b* with the aid of curve f0, has greater values for rear axle brake force Fra than curve fi from a limiting deceleration x0 (for example, of approximately 0.5 g). In addition, curve f0 has a stronger increase of rear axle brake force Fra in comparison to curve fi from limiting deceleration x0. In the fallback level, a stronger braking action of the rear axle may therefore be effectuated with the aid of temporarily dispensing with the ideal brake force distribution. In this way, in the fallback level, as shown with the aid of an arrow P, an increased deceleration of the vehicle to be decelerated is achievable with the aid of wheel brake cylinders 10 and 12. The braking system shown in FIG. 1*a* may therefore bring the vehicle to a standstill more rapidly and with a shorter braking distance, and therefore has an improved safety standard.

The braking system may also be mechanically designed for a z-critical of at least 0.8 g. In particular, the braking system may be mechanically designed for a z-critical of at least 0.9 g, also for a z-critical of at least 1 g. Alternatively or additionally thereto, the braking system may be operable due to control electronics system 14 during operation (normal operation) using a z-critical of at most 0.6 g. If desired, the braking system may also be operable due to control electronics system 14 during operation (normal operation) using a z-critical of at most 0.5 g or using a z-critical of at most 0.4 g. Therefore, the advantages of the ideal brake force distribution may be ensured during operation (normal operation) of the braking system activated with the aid of control electronics system 14 at the same time with the high safety standard of the braking system in its fallback level.

For example, in the specific embodiment of FIG. 1*a*, the at least one front axle wheel brake cylinder is situated in a (schematically shown) front axle brake circuit 22, which is connected (not disconnectable) to a master brake cylinder 24 of the braking system. In addition, the at least one rear axle wheel brake cylinder 12 is situated in a (schematically shown) rear axle brake circuit 26, rear axle brake circuit 26 being disconnectable from master brake cylinder 24 via the closing of a separating valve 16 (as one of hydraulic components 16 and 18 of the braking system). In addition, rear axle brake circuit 26 is connected via a suction line 28 to a brake fluid reservoir 30 of the braking system (having atmospheric pressure prevailing therein). Rear axle brake circuit 26 also includes at least one pump 18 (as one of hydraulic components 16 and 18 of the braking system), pump motor 32 of which is activatable with the aid of control electronics 14 in such a way that brake fluid is pumpable with the aid of the at least one pump 18 of rear axle brake circuit 26 out of brake fluid reservoir 30 into the at least one rear axle wheel brake cylinder 12 of rear axle brake circuit 26. Rear axle brake circuit 26 is therefore reliably operable in the by wire mode/by wire operating mode. In particular an ESP hev II is optimized as an ESP system 20 for operation in the by wire mode/by wire operating mode.

The mechanical design of a braking system/the design of its basic brake for a z-critical of at least 0.7 g conventionally has the result that in the normal state, excessively high or excessively low forces are distributed on the rear axle/front axle and the vehicle axle brake force distribution of the conventional braking system therefore deviates strongly from the ideal brake force distribution. With the aid of the disconnectability of the at least one rear axle wheel brake cylinder 12 of rear axle brake circuit 26 from master brake cylinder 24 by closing separating valve 16, the conventionally occurring disadvantage of a mechanical design of the braking system for a z-critical of at least 0.7 g may be bypassed/remedied, however. In particular, in this way, curve fi plotted in FIG. 1*b* for the ideal brake force distribution may be ensured during most braking actions. Dispensing with the ideal brake force distribution depicted with the aid of curve fi during a braking action only has to be accepted in the fallback level.

The advantageous braking system preferably also includes a brake booster 34, in particular an electromechanical brake booster 34. With the aid of operation of (electromechanical) brake booster 34, a driver of the vehicle equipped with the braking system may be assisted with respect to force during an actuation of a brake actuating element 36 connected to master brake cylinder 24, for example, an actuation of a brake pedal 36.

Brake booster 34 is preferably additionally activatable in the event of a functional impairment and/or a functional failure of the at least one component of the braking system, for example, the at least one hydraulic component 16 and 18 and/or control electronics system 14, in such a way that the at least one first brake pressure in the at least one front axle wheel brake cylinder 10 and/or the at least one second brake pressure in the at least one rear axle wheel brake cylinder 12 may be increased (with the aid of the activation of brake force booster 34). In particular an electromechanical brake booster 34 is well suitable for increasing the at least one first brake pressure in the at least one front axle wheel brake cylinder 10 and/or the at least one second brake pressure in the at least one rear axle wheel brake cylinder 12 in the fallback level of the braking system. Even in the event of a functional impairment or a functional failure of ESP system 20, in this case, the driver may still be assisted with respect to force with the aid of brake booster 34 in the event of an actuation of brake actuating element 36. The driver therefore has in the fallback level not only the advantages of the mechanical design of the braking system for a z-critical of at least 0.7 g, but rather also good operating comfort of brake actuating element 36 for effectuating a high level of deceleration during the braking of his/her vehicle.

A high level of deceleration of the vehicle is therefore achievable in the fallback level without wheel-individual interventions. Instead, the advantages of the comparatively high z-critical may be used for the simultaneous and joint brake pressure increase in the at least one front axle wheel brake cylinder 10 and in the at least one rear axle wheel brake cylinder 12 with the aid of brake booster 34. Above all, the driver may rapidly bring his vehicle to a standstill with comparatively little effort due to the advantageous activatability of brake booster 34 in the fallback level.

In particular an electromechanical brake booster 34 is easily activatable in the fallback level for the simultaneous and joint brake pressure increase in the at least one front axle wheel brake cylinder 10 and in the at least one rear axle wheel brake cylinder 12. For example, the corresponding activation of electromechanical brake booster 34 in the fallback level may be carried out by an activation with the aid of control electronics system 14. As an alternative to control electronics system 14, however, another vehicle-intrinsic control device may also be used for the advantageous activation of electromechanical brake booster 34 in the fallback level.

In summary, on the braking system of FIG. 1a, a redundancy concept made of ESP system 20 and (electromechanical) brake booster 34 is therefore implemented, which has an advantageous fail operational concept for the fallback level (fail operational level). If ESP system 20 is not (fully) available in the fallback level, the lack of usability of ESP system 20 may be compensated for with the aid of (electromechanical) brake booster 34.

Figure 2:
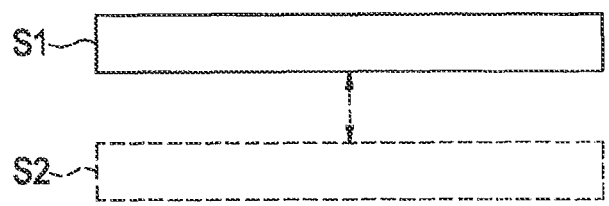
FIG. 2 shows a flow chart to explain one specific embodiment of the method for operating a braking system of a vehicle.

FIG. 2 shows a flow chart to explain one specific embodiment of the method for operating a braking system of a vehicle.

The method described hereafter may be carried out using a braking system of a vehicle/motor vehicle, for which a limiting value z-critical is definable, which specifies a maximum braking action, at which a traction stress on a front axle of the vehicle and a traction stress on a rear axle of the vehicle are equal, and which is mechanically designed for a z-critical of at least 0.7 g. The practicability of the method is not limited to the above-described braking system.

In a method step S1, the braking system is operated in a normal mode of the braking system using a z-critical of at most 0.7 g. For the braking of the vehicle, the fact is utilized that due to at least one increased first brake pressure in at least one front axle wheel brake cylinder, in each case a front axle braking torque is exerted on the front axle and/or on at least one wheel of the front axle, and due to at least one increased second brake pressure in at least one rear axle wheel brake cylinder, in each case a rear axle braking torque is exerted on the rear axle and/or on at least one wheel of the rear axle. In addition, the at least one first brake pressure in the at least one front axle wheel brake cylinder and/or the at least one second brake pressure in the at least one rear axle wheel brake cylinder is/are varied with the aid of at least one hydraulic component of the braking system. For example, the at least one second brake pressure in the at least one rear axle wheel brake cylinder may be varied in that a rear axle brake circuit including the at least one rear axle wheel brake cylinder situated therein is disconnected, via closing of a separating valve, from a master brake cylinder of the braking system, and brake fluid is pumped with the aid of at least one pump of the rear axle brake circuit from a brake fluid reservoir of the braking system into the at least one rear axle wheel brake cylinder of the rear axle brake circuit.

With the aid of a method step S2, the braking system may still advantageously be operated in the event of a functional impairment and/or a functional failure of the at least one hydraulic component of the braking system. A brake booster of the braking system is activated in such a way that the at least one first brake pressure in the at least one front axle wheel brake cylinder and/or the at least one second brake pressure in the at least one rear axle wheel brake cylinder is/are increased. Therefore, carrying out the method described here also yields the above-described advantages.

Figure 3:
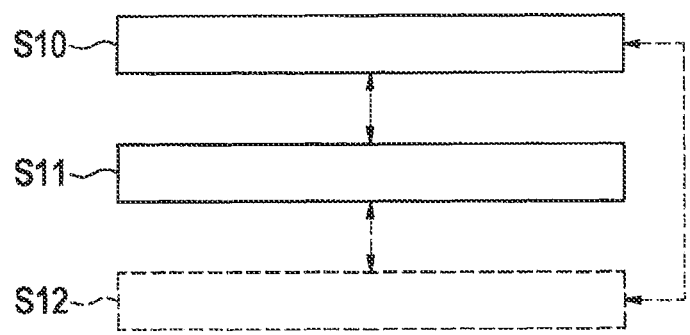
FIG. 3 shows a flow chart to explain one specific embodiment of the manufacturing method for a braking system for a vehicle.

FIG. 3 shows a flow chart to explain one specific embodiment of the manufacturing method for a braking system for a vehicle.

In a method step S10, the braking system is equipped with at least one front axle wheel brake cylinder, in which at least one first brake pressure may be built up, and with at least one rear axle wheel brake cylinder, in which at least one second brake pressure may be built up. This is carried out in such a way that during operation of the braking system, with the aid of the at least one front axle wheel brake cylinder, in each case a front axle braking torque is exerted on a front axle of the vehicle and/or on at least one wheel of the front axle, and, with the aid of the at least one rear axle wheel brake cylinder, in each case a rear axle braking torque is exerted on a rear axle of the vehicle and/or on at least one wheel of the rear axle. In addition, it is ensured that a limiting value z-critical is definable for the braking system, which specifies a maximum braking action, at which a traction stress on the front axle of the vehicle and a traction stress on the rear axle of the vehicle are equal, and the braking system is/remains mechanically designed for a z-critical of at least 0.7 g.

In one advantageous specific embodiment of the manufacturing method, the at least one front axle wheel brake cylinder is situated in a front axle brake circuit connected (not disconnectable) to a master brake cylinder of the braking system. In contrast, the at least one rear axle wheel brake cylinder is preferably situated in a rear axle brake circuit, which is connected via a separating valve to the master brake cylinder. In addition, it is advantageous if the rear axle brake circuit is connected via a suction line to a brake fluid reservoir of the braking system and is equipped with at least one pump for pumping brake fluid out of the brake fluid reservoir into the at least one rear axle wheel brake cylinder of the rear axle brake circuit.

In a method step S11 of the manufacturing method, the braking system is equipped with a control electronics system, with the aid of which at least one hydraulic component of the braking system is activatable in such a way that, during the operation of the braking system, the at least one first brake pressure in the at least one front axle wheel brake cylinder and/or the at least one second brake pressure in the at least one rear axle wheel brake cylinder is/are varied, the control electronics system being designed in such a way that the braking system is controlled due to the control electronics system during operation using a z-critical of at most 0.7 g.

The control electronics system may in particular use the separating valve and/or the at least one pump to vary the at least one second brake pressure in the at least one rear axle wheel brake cylinder.

Optionally, a method step S12 is also carried out in the manufacturing method. In method step S12, a brake booster of the braking system is designed in such a way that in the event of a functional impairment and/or a functional failure of the at least one hydraulic component of the braking system, the at least one first brake pressure in the at least one front axle wheel brake cylinder and/or the at least one second brake pressure in the at least one rear axle wheel brake cylinder is/are increased with the aid of the activated brake booster.

Method steps S10 through S12 may be carried out in any arbitrary sequence and/or (at least partially) simultaneously.

Therefore, the manufacturing method described here also ensures the above-described advantages. In addition, it is to be noted that the practicability of the manufacturing method is not limited to manufacturing the above-described braking system.

What is claimed is:

1. A braking system for a vehicle, comprising:
at least one front axle wheel brake cylinder, in which at least one first brake pressure is built up to exert a front axle braking torque at least one of on a front axle of the vehicle and on at least one wheel of the front axle;
at least one rear axle wheel brake cylinder, in which at least one second brake pressure is built up to exert a rear axle braking torque at least one of on a rear axle of the vehicle and on at least one wheel of the rear axle; and
a control electronics system configured to activate at least one hydraulic component of the braking system in such a way that at least one of the at least one first brake pressure in the at least one front axle wheel brake cylinder and at least one second brake pressure in the at least one rear axle wheel brake cylinder is variable;
wherein a z-critical value specifies, for the braking system, a maximum braking action at which a frictional stress on the front axle of the vehicle and a frictional stress on the rear axle of the vehicle are equal, wherein the braking system is mechanically configured for the z-critical value of at least 0.7 g, and wherein the braking system is controlled by the control electronics during operation using the z-critical value of at most 0.7 g.

2. The braking system as recited in claim 1, wherein the at least one front axle wheel brake cylinder is situated in a front axle brake circuit connected to a master brake cylinder of the braking system, and the at least one rear axle wheel brake cylinder is situated in a rear axle brake circuit, and the rear axle brake circuit is configured to be selectably disconnectable from the master brake cylinder via closing of a separating valve.

3. The braking system as recited in claim 2, wherein the rear axle brake circuit is connected via a suction line to a brake fluid reservoir of the braking system, and at least one pump of the rear axle brake circuit is activated with the aid of the control electronics system in such a way that brake fluid is pumped with the aid of the at least one pump of the rear axle brake circuit out of the brake fluid reservoir into the at least one rear axle wheel brake cylinder of the rear axle brake circuit.

4. The braking system as recited in claim 1, wherein the braking system includes a brake booster, and in the event of a functional impairment of at least one of the at least one hydraulic component of the braking system and the control electronics system, the brake booster is activated in such a way that at least one of the at least one first brake pressure in the at least one front axle wheel brake cylinder and the at least one second brake pressure in the at least one rear axle wheel brake cylinder is increased.

5. The braking system as recited in claim 1, wherein the braking system is mechanically configured for the z-critical value of at least 0.8 g.

6. The braking system as recited in claim 5, wherein the braking system is mechanically configured for the z-critical value of at least 0.9 g.

7. The braking system as recited in claim 1, wherein the braking system is controlled using the control electronics system during operation using the z-critical value of at most 0.6 g.

8. The braking system as recited in claim 7, wherein the braking system is controlled using the control electronics system during operation using the z-critical value of at most 0.5 g.

9. A method for operating a braking system of a vehicle, for which a z-critical value is defined, the z-critical value specifying a maximum braking action at which a frictional stress on a front axle of the vehicle and a frictional stress on a rear axle of the vehicle are equal, the braking system being mechanically configured for the z-critical value of at least 0.7 g, the method comprising:
operating the braking system at least in a normal mode of the braking system using the z-critical value of at most 0.7 g to (i) apply a first brake pressure in at least one front axle wheel brake cylinder to exert a front axle braking torque on at least one of the front axle and at least one wheel of the front axle, and (ii) apply a second brake pressure in at least one rear axle wheel brake cylinder to exert a rear axle braking torque on at least one of the rear axle and at least one wheel of the rear axle; and
varying at least one of the first brake pressure in the at least one front axle wheel brake cylinder and the second brake pressure in the at least one rear axle wheel brake cylinder with the aid of at least one hydraulic component of the braking system.

10. The method as recited in claim 9, wherein the at least one second brake pressure in the at least one rear axle wheel brake cylinder is varied by (i) disconnecting a rear axle brake circuit having the at least one rear axle wheel brake cylinder from a master brake cylinder of the braking system by closing of a separating valve, and (ii) pumping brake fluid with the aid of at least one pump of the rear axle brake circuit from a brake fluid reservoir of the braking system into the at least one rear axle wheel brake cylinder of the rear axle brake circuit.

11. The method as recited in claim 10, wherein in the event of a functional impairment of the at least one hydraulic component of the braking system, a brake booster of the braking system is activated to increase at least one of (i) the at least one first brake pressure in the at least one front axle wheel brake cylinder and (ii) the at least one second brake pressure in the at least one rear axle wheel brake cylinder.

12. A manufacturing method for a braking system for a vehicle, comprising:
providing at least one front axle wheel brake cylinder, in which at least one first brake pressure is built up to exert a front axle braking torque at least one of on a front axle of the vehicle and on at least one wheel of the front axle;
providing at least one rear axle wheel brake cylinder, in which at least one second brake pressure is built up to exert a rear axle braking torque at least one of on a rear axle of the vehicle and on at least one wheel of the rear axle; and
providing a control electronics system configured to activate at least one hydraulic component of the braking system in such a way that at least one of the at least one first brake pressure in the at least one front axle wheel brake cylinder and at least one second brake pressure in the at least one rear axle wheel brake cylinder is variable;

wherein a z-critical value specifies, for the braking system, a maximum braking action at which a frictional stress on the front axle of the vehicle and a frictional stress on the rear axle of the vehicle are equal, and wherein the braking system is mechanically configured for the z-critical value of at least 0.7 g, and wherein the braking system is controlled by the control electronics during operation using the z-critical value of at most 0.7 g, and wherein the control electronics system is configured to control the braking system during operation using the z-critical value of at most 0.7 g.

13. The manufacturing method as recited in claim 12, wherein the at least one front axle wheel brake cylinder is situated in a front axle brake circuit connected to a master brake cylinder of the braking system, and the at least one rear axle wheel brake cylinder is situated in a rear axle brake circuit, which is connected via a separating valve to the master brake cylinder, and the rear axle brake circuit is connected via a suction line to a brake fluid reservoir of the braking system and is equipped with at least one pump for pumping brake fluid from the brake fluid reservoir into the at least one rear axle wheel brake cylinder of the rear axle brake circuit.

14. The manufacturing method as recited in claim 12, wherein a brake booster of the braking system is configured in such a way that, in the event of a functional impairment of the at least one hydraulic component of the braking system, at least one of (i) the at least one first brake pressure in the at least one front axle wheel brake cylinder and (ii) the at least one second brake pressure in the at least one rear axle wheel brake cylinder is increased with the aid of the activated brake booster.

* * * * *